United States Patent
Jeter, Jr.

(10) Patent No.: US 8,915,168 B2
(45) Date of Patent: Dec. 23, 2014

(54) COUNTER BORING SOCKET

(76) Inventor: Robert Gale Jeter, Jr., Dallastown, PA (US)

(*) Notice: Subject to any disclaimer, the term of this patent is extended or adjusted under 35 U.S.C. 154(b) by 238 days.

(21) Appl. No.: 13/521,476

(22) PCT Filed: Sep. 12, 2011

(86) PCT No.: PCT/US2011/051151
§ 371 (c)(1),
(2), (4) Date: Jul. 11, 2012

(87) PCT Pub. No.: WO2013/009333
PCT Pub. Date: Jan. 17, 2013

(65) Prior Publication Data
US 2013/0061400 A1    Mar. 14, 2013

Related U.S. Application Data

(60) Provisional application No. 61/507,811, filed on Jul. 14, 2011.

(51) Int. Cl.
| B25B 13/06 | (2006.01) |
| B25B 31/00 | (2006.01) |
| B25F 1/00  | (2006.01) |
| B23B 51/04 | (2006.01) |
| B23B 51/08 | (2006.01) |

(52) U.S. Cl.
CPC ............. *B23B 51/0406* (2013.01); *B23B 51/08* (2013.01)

USPC ............................................. 81/121.1; 7/138

(58) Field of Classification Search
USPC ............................ 81/53.2, 121.1; 7/138, 158
See application file for complete search history.

(56) References Cited

U.S. PATENT DOCUMENTS

| 74,490 A * | 2/1868 | Bidwell .......................... 7/158 |
| 1,683,796 A * | 9/1928 | Pearce .......................... 81/53.2 |
| 2,864,273 A * | 12/1958 | Hentosh ....................... 81/124.7 |
| 6,877,402 B1 * | 4/2005 | Pigford et al. ................. 81/53.2 |
| 7,237,291 B2 * | 7/2007 | Redford .......................... 7/138 |
| 7,240,588 B1 | 7/2007 | Rinner |
| 7,594,455 B2 * | 9/2009 | Swanson et al. ............... 81/53.2 |
| 2004/0079202 A1 * | 4/2004 | Chrzanowski ................. 81/53.2 |
| 2005/0132847 A1 | 6/2005 | Garg |
| 2005/0260047 A1 * | 11/2005 | Keiper .......................... 408/201 |
| 2008/0084077 A1 | 4/2008 | Alcov |
| 2012/0266560 A1 * | 10/2012 | Panasik et al. ............... 52/783.1 |

FOREIGN PATENT DOCUMENTS

| JP | 06-226651 A | 8/1994 |
| JP | 2002-337057 A | 11/2002 |

OTHER PUBLICATIONS

PCT International Search Report in corresponding PCT application PCT/US2011/051151 (9 pages).

* cited by examiner

*Primary Examiner* — David B Thomas

(57) ABSTRACT

A socket for driving a threaded fastener into a material has teeth spaced around a fastener opening. The teeth cut out a counterbore hole that receives the head of the fastener as the fastener threads into the material.

12 Claims, 1 Drawing Sheet

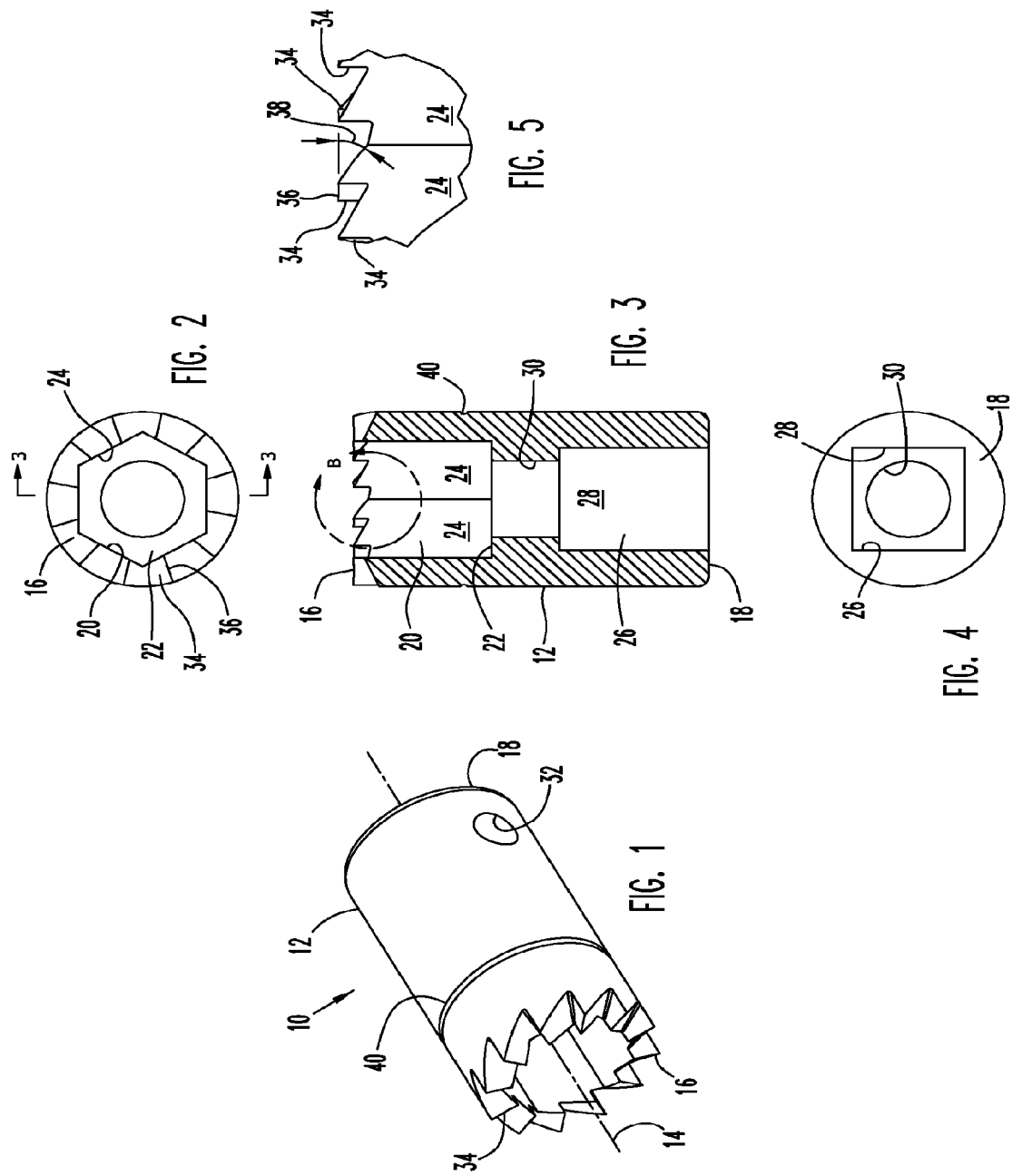

COUNTER BORING SOCKET

Field of the Invention

The invention relates to tools for driving threaded fasteners, and more particularly, to a socket for receiving and driving threaded fasteners such as lag screws and lag bolts used to mechanically connect wooden structural members.

BACKGROUND OF THE INVENTION

Lag screws, also known as lag bolts, are threaded fasteners typically used to mechanically connect together wooden structural members such as posts and beams.

A conventional lag screw has a threaded shank extending from an enlarged head to a pointed free end of the shank. The head is an enlarged hexagonally-shaped head that, when inserted into a socket, forms a non-rotatable connection with the socket that permits torque to be transmitted from the socket to the screw. A typical socket that can be used to install lag screws is disclosed in Garg, U.S. Pat. No. 6,951,156.

It is often required that the head of the lag screw sit flush with or below the wood surface when installed. This requires that a counterbore be drilled in the wood prior to installing the fastener. The counterbore receives the fastener head. The hole of the counterbore must be the correct size to closely receive the head, and the bottom of the counterbore must be at the correct depth so that the head when installed is flush with or the desired distance below the wood surface.

Cutting a counterbore in the wood prior to installing a lead screw adds a step to the fastening process. When installing a large number of lag screws, the added cost can be substantial. Furthermore, if the counterbore is incorrectly located or cut to the wrong depth, the wood member may have to be scrapped or corrective action taken—further increasing cost.

Thus there is a need for an improved method of providing counterbores for receiving the head of lag screws and similar type fasteners. The improved method should enable the fastener to be installed in the same step as providing the counterbore so that the extra step in the fastening process can be eliminated. The improved method should enable the proper depth of cut to be readily determined during the installation of the lag screw, and should be compatible with existing socket wrenches and other conventional fastener drives.

SUMMARY OF THE INVENTION

The invention is an improved method of providing counterbores for receiving the head of lag screws and similar fasteners, and an improved socket for carrying out the method. The socket enables the fastener to be installed in the same step as providing the counterbore, and enables the proper depth of cut to be readily determined during installation of the lag screw. The socket is compatible with conventional socket wrenches and other conventional fastener drives.

The method of the present invention includes inserting the head of the lag screw or other fastener into a fastener opening of a socket body and thereby forming a non-rotatable connection between the socket body and the fastener head. The fastener opening extends into the socket body from a fastener end of the socket body, and the socket body includes a number of cutting teeth at the fastener end circumferentially spaced about the fastener opening.

The free end of the threaded shank is placed against the lumber surface and drive torque is applied to the socket body, causing the socket body to rotate and thread the threaded portion of the shank along an axis into the material. The threaded portion of the shank threads into the material until the teeth of the socket body engage the material. Axial pressure is then applied to the socket body causing the cutting teeth to dig into the material and cut a counterbore that receives the head of the lag screw. The socket body continues to rotate and thread the shank through the material until the cutting teeth reach a desired depth of cut from the lumber surface material.

After reaching the desired depth of cut, the axial pressure is relieved so that the lag screw can be torqued and a secure mechanical connection created. The torque to the socket body is then relieved and the socket is removed. It has been found that placing teeth at the end of the socket body to cut into the lumber while driving the lag screw cooperates with the hole generated by the threaded shank to form the counterbore that receives the head of the lag screw as the head moves flush with or below the lumber surface.

In preferred embodiments of the invention the socket body includes a depth-of-cut indicator visible from the outside of the socket body. The depth-of-cut indicator may be a circumferential groove on the outside of the socket body. When the depth-of-cut indicator is substantially flush with the lumber surface, the head of the lag screw is also substantially flush with the lumber surface.

The method of installing countersunk threaded fasteners in accordance with the present invention has many advantages in addition to reducing labor and material costs. Using a socket correctly sized to receive the fastener head automatically sizes the counterbore to the proper size for the fastener head. The socket can be readily adapted for use with conventional fastener drives, including ratched and non-ratched socket wrenches, open-ended wrenches, adjustable wrenches, and the like, and the socket may be manually, mechanically, or hydraulically driven.

Other objects and features of the invention will become apparent as the description proceeds, especially when taken in conjunction with the accompanying drawing sheet illustrating an embodiment of the invention.

BRIEF DESCRIPTIONS OF THE DRAWINGS

FIG. 1 is a perspective view of a socket in accordance with the present invention;

FIG. 2 is a view of the drive end of the socket shown in FIG. 1;

FIG. 3 is a vertical sectional view taken along lines 3-3 of FIG. 2;

FIG. 4 is a view of the fastener end of the socket shown in FIG. 1; and

FIG. 5 is an enlarged view of the portion "B" of FIG. 3.

DESCRIPTION OF THE PREFERRED EMBODIMENT

The figures illustrate a socket 10 in accordance with the present invention. The socket 10 transmits torque to a threaded fastener (not shown) being threadingly inserted into a material (not shown) while simultaneously forming a counterbore in the material around the head of the fastener.

The socket 10 includes a generally elongate tubular socket body 12 that extends along a central longitudinal axis 14. The socket body 12 extends from a fastener end 16 to an axially opposite drive end 18.

A non-circular fastener opening 20 extends axially from the fastener end 16 into the socket body 12 to an end surface facing the fastener end 16. The illustrated fastener opening 20 is hexagon-shaped and is bounded by six flat fastener side surfaces or walls 24 that form a non-rotatable connection with the facing sides of a hexagonal fastener head inserted into the fastener opening 20 to transmit torque from the socket body 12 to the fastener head. The number of fastener surfaces 24 may vary in other embodiments to conform to fastener heads of other shapes, and the fastener surfaces 24 may be convex as is already known in the socket art.

A non-circular drive opening 26 extends axially from the drive end 20 into the socket body 12. The illustrated driver opening 26 is square-shaped and is bounded by four flat drive side surfaces or walls 28 that form a non-rotatable connection with the facing sides of a socket wrench lug (not shown) inserted into the drive opening 26 to transmit torque from the lug to the socket body 12. The number of drive surfaces 28 may vary in other embodiments to conform to drive lugs or drive heads of other shapes and the drive surfaces 28 may be convex.

A circular hole 30 coaxial with the fastener and drive openings 20, 26 connects and extends between them whereby the openings 20, 26 and the hole 30 define a central through-bore extending through the socket body 12. A radial side bore 32 extends from the drive opening 26 and opens to the outer periphery of the socket body 12 as shown in FIG. 1 to accept a locking member carried on the socket wrench lug.

A number of like cutting teeth 34 are located at the fastener end 16 of the socket body 12 and surround the fastener opening 20. The teeth 34 are spaced around the fastener opening 20 and are configured to cut into a material when the socket body is rotated in the same direction to tighten a fastener. The illustrated embodiment has twelve uniformly spaced teeth 34 that are configured for cutting with right-handed fastener threads, but in other embodiments the teeth 34 can be configured for cutting with left-handed fastener threads.

Each cutting tooth 34 has a cutting edge 36 that extends from a fastener wall 24 to the outer periphery of the socket body 12 and extends in a line radial to the axis 14 as best seen in FIG. 2. The illustrated cutting teeth 34 each have a positive, non-zero clearance angle 38 that enable the tooth to advance into the material when the socket body 12 is rotating in the tightening direction.

A depth-of-cut indicator 40 is visible from the outside of the socket 10. In the illustrated embodiment the depth-of-cut indicator 40 is formed as a relatively shallow, circumferential groove on the outside of the socket body 12. The depth-of-cut indicator 40 is axially spaced away from the fastener end 16 to indicate a predetermined depth of cut when the indicator 40 is flush with a material surface.

Operation of the socket 10 to drive a lag screw into a piece of lumber will be now described. The head of a lag screw (not shown) is inserted into the fastener opening 20 and placed against the back end surface 22. The free end of the lag screw is placed against the lumber surface with the socket 10 spaced from the surface. A drive torque is applied to the socket 10 by a conventional socket wrench or other conventional socket drive (not shown), causing the socket body to rotate in the fastener insertion direction. The fastener shank extends into the lumber until the slot cutting teeth 34 engage the lumber surface. Axial pressure is then preferably applied to the socket 10 urging the cutting teeth 34 against the lumber and cutting into the lumber. Continued rotation of the socket 10 forces the cutting teeth 34 into the lumber to form a counterbore around the fastener head. When the depth-of-cut indicator 40 is flush with the lumber surface the axial pressure is relieved and the lag screw is torqued to the desired torque to form a secure mechanical connection.

The drive torque is removed and the socket body 12 is removed from the fastener. The head of the lag screw is set flush or slightly below the surface of the lumber.

The illustrated socket 10 is preferably one of a set made of a number of similar sockets for driving fasteners of different sizes, each socket sized to receive a different sized fastener. Optionally the outside of the socket body 12 can be configured with drive faces as disclosed in the Garg '156 patent.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A socket for transmitting torque to a fastener extending through a material while simultaneously forming a counterbore in said material around the fastener, the socket comprising:
    a socket body extending along an axis;
    the socket body comprising a fastener end and an axially opposite drive end;
    a drive opening extending axially from the drive end into the socket body, the drive opening configured to form a non-rotatable connection with a drive inserted into the drive opening to transmit torque from the drive to the socket body;
    a fastener opening extending axially from the fastener end into the socket body, the fastener opening configured to form a non-rotatable connection with a fastener inserted into the fastener opening to transmit torque from the socket body to the fastener; and
    a plurality of cutting teeth at the fastener end surrounding the fastener opening;
    wherein each tooth of said plurality of cutting teeth has a non-zero positive clearance angle.

2. The socket of claim 1 wherein the fastener opening is bounded by a non-circular wall and each tooth of said plurality of cutting teeth extends from the wall.

3. The socket of claim 2 wherein each tooth of said plurality of cutting teeth extends from the non-circular wall to an outer periphery of the socket body.

4. The socket of claim 1 wherein the socket body comprises a depth-of-cut indicator visible on the outside of the socket body.

5. A socket for transmitting torque to a fastener extending through a material while simultaneously forming a counterbore in said material around the fastener, the socket comprising:
    a socket body extending along an axis;
    the socket body comprising a fastener end and an axially opposite drive end;
    a drive opening extending axially from the drive end into the socket body, the drive opening configured to form a non-rotatable connection with a drive inserted into the drive opening to transmit torque from the drive to the socket body;
    a fastener opening extending axially from the fastener end into the socket body, the fastener opening configured to form a non-rotatable connection with a fastener inserted into the fastener opening to transmit torque from the socket body to the fastener; and
    a plurality of cutting teeth at the fastener end surrounding the fastener opening;
    wherein the socket body comprises a depth-of-cut indicator visible on the outside of the socket body.

6. The socket of claim 5 wherein the depth-of-cut indicator is a groove on the outside of the socket body extending around the axis.

7. The socket of claim 5 wherein the fastener opening extends from the fastener end to an internal surface of the socket body facing the opening, the depth-of-cut indicator axially located between the end surface and the plurality of teeth.

8. The socket of claim 5 wherein the fastener opening is bounded by a non-circular wall and each tooth of said plurality of cutting teeth extends from the wall.

9. The socket of claim 8 wherein each tooth of said plurality of cutting teeth extends from the non-circular wall to an outer periphery of the socket body.

10. The socket of claim 8 wherein each tooth of said plurality of cutting teeth has a non-zero positive clearance angle.

11. The socket of claim 10 wherein each tooth of said plurality of cutting teeth extends from the non-circular wall to an outer periphery of the socket body.

12. A method of installing a threaded fastener into a material using a socket body, the fastener of the type having a head and a threaded shank extending from the head to a free end, the socket body having a depth-of-cut indicator, the method comprising the steps of:

(a) inserting the head of the fastener into a fastener opening of a socket body and thereby forming a non-rotatable connection between the socket body and the fastener head, the fastener opening extending into the socket body from a fastener end of the socket body, the socket body comprising a plurality of cutting teeth at the fastener end circumferentially spaced about the fastener opening;

(b) placing the free end of the threaded shank against a surface of the material;

(c) rotating the socket body to thereby rotate the fastener and thereby threading the threaded portion of the fastener from the material surface and into the material until the plurality of cutting teeth engage the material;

(d) continuing to rotate the socket body after the cutting teeth initially engage the material and threading the threaded portion of the fastener through the material until the plurality of cutting teeth reach a desired depth of cut from the material surface and into the material and stopping rotation of the socket body when the depth-of-cut indicator is substantially flush with or below the material surface.

* * * * *